No. 775,726. PATENTED NOV. 22, 1904.
V. O. JOHNSON.
MILKING DEVICE.
APPLICATION FILED NOV. 10, 1903.
NO MODEL. 2 SHEETS—SHEET 1.
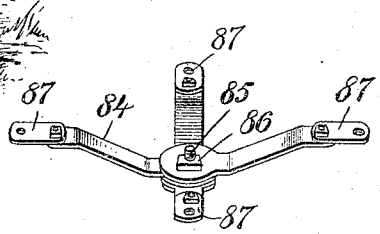
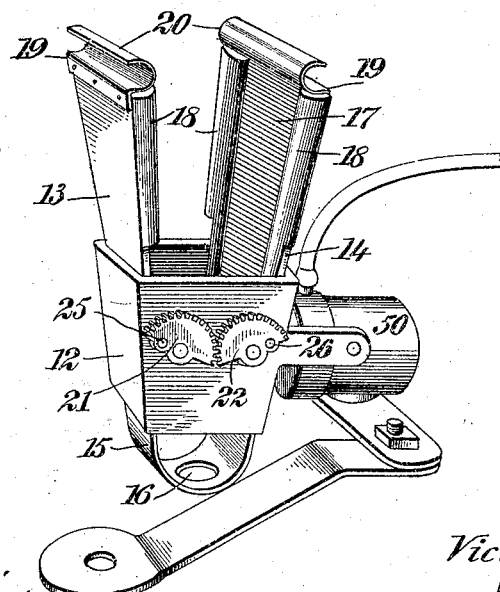
WITNESSES:
INVENTOR
Victor O. Johnson
BY
ATTORNEYS No. 775,726. PATENTED NOV. 22, 1904.
V. O. JOHNSON.
MILKING DEVICE.
APPLICATION FILED NOV. 10, 1903.
NO MODEL. 2 SHEETS—SHEET 2.
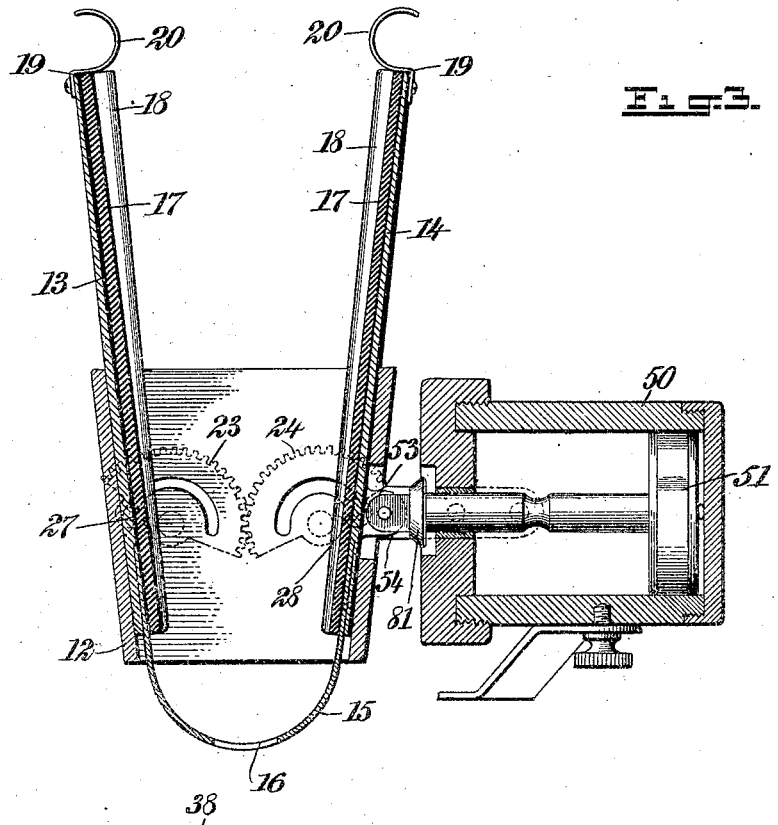
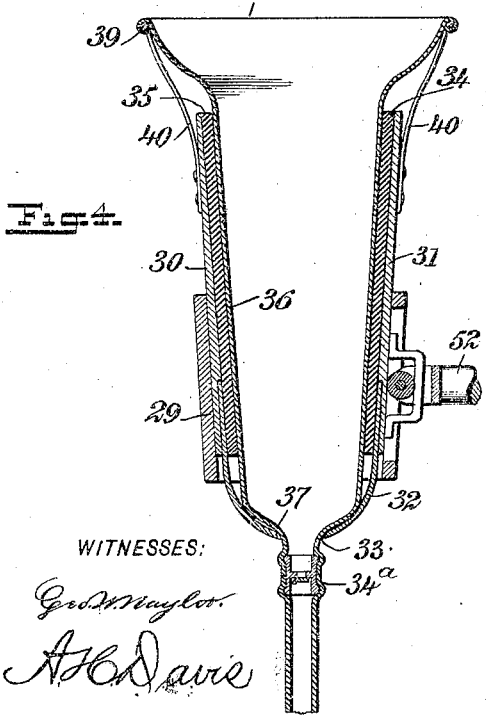
WITNESSES:
INVENTOR
Victor O. Johnson
BY
ATTORNEYS No. 775,726. Patented November 22, 1904.

UNITED STATES PATENT OFFICE.

VICTOR O. JOHNSON, OF ORD, NEBRASKA.

MILKING DEVICE.

SPECIFICATION forming part of Letters Patent No. 775,726, dated November 22, 1904.

Application filed November 10, 1903. Serial No. 180,570. (No model.)

*To all whom it may concern:*

Be it known that I, VICTOR O. JOHNSON, a citizen of the United States, and a resident of Ord, in the county of Valley and State of Nebraska, have invented new and useful Improvements in Milking Devices, of which the following is a full, clear, and exact description.

This invention relates to a device that when placed in position on a cow and power is applied will milk the animal.

One object of the present invention is to provide an improved form of squeezers, having suitable projecting faces for engaging the animal and a means of accelerating the flow of milk from the udder to the teats of the animal, when the squeezers return to normal position after having operated on the teats.

Another object is to provide an improved form of motor especially adapted to operate the squeezers; and a further object is to provide an improved connection between the squeezers and the motor.

With these objects in view and others my invention comprises the novel features of construction and arrangement of parts, as hereinafter set forth and then pointed out in the claims.

Reference is to be had to the accompanying drawings, forming a part of this specification, in which similar characters of reference indicate corresponding parts in all the figures.

Figure 1 shows a device embodying my invention in position for operation. Fig. 2 is a perspective view, on an enlarged scale, of one of the four milkers. Fig. 3 is a vertical longitudinal section through the device shown in Fig. 2. Fig. 4 is a vertical section of a modified form of squeezers with an inner tube in position, and Fig. 5 is a perspective view of a connecting device hereinafter more particularly described.

Referring now to the drawings, especially to Figs. 2 and 3, I provide a supporting member 12, preferably somewhat hopper-shaped, with the four sides converging. In the box are arranged a pair of squeezers 13 14, preferably made of rather stiff spring metal. The squeezers are connected at their lower ends by a U-shaped spring-plate 15, having an opening 16 in its lower middle portion. This spring 15 tends to retain the squeezers in contact with the opposite sides of the box 12. The squeezers are preferably each lined with a sheet of rubber 17, having ribs 18 along the side edges, and at the upper end of each squeezer is secured a spring strip 19, having a U-shaped bend 20 projecting inwardly, as shown in Fig. 3. The object of thus forming the squeezers is that when they are moved together the bends 20 20 will first compress the teat at its upper portion, thereby preventing the milk flowing back into the udder, while the side ribs will make a channel conforming somewhat to the teat. I support the squeezers in the box 12 in such a manner that when they are brought together they will first move upward and at the same time approach each other, and then they will have a downward movement while still advancing. My preferred means for so supporting the squeezers is to pivot on two sides of the box 12 two segment gears, the gears 21 and 22 on one side being in engagement and the gears 23 and 24 on the opposite side of the box also having their teeth meshing. Said gears are pivotally connected with the adjacent side edges of the squeezers by pins 25, 26, 27, and 28, respectively.

As will be observed from Figs. 2 and 3, when the squeezers 13 and 14 are in the open position the pivots of the squeezers with the gears each lie a short distance above the horizontal plane of the pivots of the gears. Consequently when the squeezers are moved together by any preferred means, either by hand or otherwise, they will move through an arc of a circle—that is, they will first move upward in approaching and then downward. The result of this movement will be that with the device supported by any preferred means, with the top of the squeezers normally in engagement with the teat at its uppermost part, the bends 20 20 in compressing the teat will also force it somewhat upward and also compress the udder upward. This latter movement will occur before the passage in the teat is closed and will have the effect of forcing the milk in that part of the udder down into the teat. Thereupon the bends 20 further approaching will cut off the passage in the teat, while the other portions of the squeezers will compress the teat below the upper part, and thus force out the milk. It will be understood that the spring connection 15 acts as a hinge between the lower ends of the squeezers, and if made of sufficient strength also serves to return the blades to their open position. The milk will pass downward through the opening 16.

A slight modification is shown in Fig. 4, in which a box 29 carries squeezers 30 31, connected at their lower ends by a V-shaped spring 32, that has an opening 33 therein. These squeezers may be supported for movement by gears in the same manner that the squeezers 13 and 14 are supported in the box 12. The squeezers 30 and 31 have flat rubber plates 34 35 on their opposing faces. Inside of the box 29 is placed a tube or nipple 36, made, preferably, of soft rubber, having a non-stretchable canvas backing. At its lower end the nipple tapers to a neck 37, that passes through the aperture 33, which neck contains a check-valve 34ª, that opens downward, permitting the milk to pass downwardly, but closing and preventing the milk or air from passing upwardly into the nipple 36. The upper end of the nipple has a flaring portion 38, extending beyond the squeezers, and also has a supporting-ring 39 held in place by supports 40 40. The purpose of the tube or nipple 36 is to create a partial vacuum between the squeezers when they return to their normal position after having been moved toward each other, and thus accelerate the flow of milk from the udder to the teat of the animal.

The device can be operated by any suitable means; but I prefer to employ a compressed-air motor. As shown in the drawings, 50 is the cylinder, 51 the piston, and 52 the piston-rod of a compressed-air motor of any approved construction. The cylinder 50 is pivotally connected with the supporting member 12 by links 54, and the piston-rod 52 has its outer end pivoted to a lug 53, secured to the squeezer 14.

The four milkers, as shown in Fig. 1, are secured together by a brace (shown in detail on Fig. 5) and comprising four arms 84, crossed and connected at their point of intersection by a bolt 85 and nut 86, each arm having a clip 87 attached to its outer end, each of which clips is secured to the cylinder 50, such connection being as near as possible to the center of gravity of the motor and the squeezers.

The above-described brace will require no moving of screws or bolts when the milker is changed from a cow whose teats are close together to one whose teats are farther apart.

Having thus described my invention, I claim as new and desire to secure by Letters Patent—

1. In a milking device, the combination of a supporting member, a pair of squeezers on the said member and connected at their lower ends by an apertured spring-plate, the squeezers being supported to move simultaneously toward or from each other and also to have longitudinal movement, first upward and then downward, and means for operating said squeezers.

2. In a milking device, the combination of a supporting member, a pair of squeezers on the said member, the squeezers being yieldingly connected and supported to move simultaneously together or apart, and also to have a longitudinal movement, first upward and then downward, and means for creating a partial vacuum between the squeezers when they return to normal position.

3. In a milking device, the combination of a supporting member, a pair of squeezers on the said member, one of the squeezers being supported to move to and from the other, and when advanced to also have a longitudinal movement, first upward and then downward, the squeezers being connected by an elastic plate at their lower ends, and in their open position diverging upward, and means for creating a partial vacuum between the squeezers when they return to normal position.

4. In a milking device, the combination of a supporting member, a pair of squeezers on the said member, one of the squeezers being supported to move to and from the other, and when advanced to also have a longitudinal movement, first upward and then downward, the squeezers being connected by an elastic plate at their lower ends, and in their open position diverging upward, an inwardly-projecting U-shaped spring secured to the upper end of each squeezer, and means for creating a partial vacuum between the squeezers when they return to normal position.

5. In a milking device, the combination of a supporting member, a pair of squeezers carried by said member, one of the squeezers being movable to and from the other, the squeezers each having an inwardly-projecting rib on each edge of their opposing faces, and means for creating a partial vacuum between the squeezers when they return to normal position.

6. In a milking device, the combination of a supporting member, a squeezer carried by said member, a second squeezer, a movable connection between the lower end of the second squeezer and the supporting member, a block pivoted to the supporting member on each side adjacent to the side of the second squeezer, each block being also pivoted to the second squeezer, the latter being thereby supported to move when advanced to the other squeezer, first upward and then downward, and means for creating a partial vacuum between the squeezers when they return to normal position.

7. In a milking device, the combination of a supporting member, a squeezer carried by said member, a second squeezer, a movable connection between the lower end of the second squeezer and the supporting member, a block pivoted to the supporting member on each side adjacent the side of the second squeezer, each block being also pivoted to the second squeezer, the latter being thereby supported to move when advanced to the other squeezer first upward and then downward, a reciprocating motor pivotally connected with the supporting member, the piston-rod of the motor being pivoted to said second squeezer, and means for creating a partial vacuum between the squeezers when they return to normal position.

8. In a milking device, the combination of a supporting member, a pair of squeezers located inside said member, and connected at their lower ends by a spring-plate, a pair of segment-gears mounted on each side of the supporting member with their teeth in engagement, each gear being pivoted to the side of one of the squeezers, whereby when the squeezers are advanced they will also move first upward and then downward, and means for creating a partial vacuum between the squeezers when they return to normal position.

9. In a milking device, the combination of a supporting member, a pair of squeezers located inside said member, and connected at their lower ends by a spring-plate, a pair of segment-gears mounted on each side of the supporting member with their teeth in engagement, each gear being pivoted to the side of one of the squeezers, whereby when the squeezers are advanced they will also move first upward and then downward, a reciprocating motor pivotally connected with the supporting member, the piston-rod of the motor being pivoted to one of the squeezers, and means for creating a partial vacuum between the squeezers when they return to normal position.

10. In a milking device, the combination of a supporting member, a pair of squeezers carried by the said member, the squeezers being movable to and from each other, a spring connecting the squeezers together at their lower ends, and a reciprocating motor connected with the supporting member, the motor having its piston pivotally connected with one of said squeezers, a nipple between the squeezers and means for creating a partial vacuum in the nipple when the squeezers return to normal position.

11. In a milking device, the combination of a supporting member, a pair of connected squeezers mounted in the supporting member, gears mounted on said supporting member and pivotally connected with the squeezers and meshing with each other, and a reciprocating device connected with one of the squeezers.

12. In a milking device, the combination of a box-like support, a pair of squeezers mounted in the support and connected at their lower ends by an elastic plate, segmental gears mounted on the support and pivotally connected with the squeezers and meshing with each other, and a reciprocating device connected with one of the squeezers.

13. In a milking device, the combination of a supporting member, a pair of squeezers carried thereby, a nipple carried between said squeezers and having a flaring portion at its upper end extending beyond the squeezers, a supporting-ring for said flaring portion, supports for said ring, reciprocating means engaging one of the squeezers, and means connecting the squeezers together, whereby to cause the squeezers to move to or from each other.

14. In a milking device, the combination of a supporting member, a pair of squeezers carried thereby, a V-shaped spring having an opening at its center, a flexible nipple carried between said squeezers and provided at its upper end with a flaring portion extending above the squeezers and at its lower end with a valved neck extending downwardly through said opening in the V-shaped spring, a ring secured at the upper edge of said flaring portion, supports for said ring, and means for moving the squeezers to and from each other in unison.

15. In a milking device, the combination of a supporting member, a pair of connected squeezers carried by the said member and supported to move simultaneously toward and from each other and also to have longitudinal movement, a flexible nipple between the squeezers and having a neck at its lower end, and a check-valve in said neck.

16. In a milking device, the combination of a supporting member, a pair of squeezers mounted in the supporting member to move simultaneously toward and from each other and also to have longitudinal movement, said squeezers being connected by a flexible apertured plate, a flexible nipple having a flaring upper end and a neck at its lower end, said neck extending through the aperture of the said flexible plate, and a check-valve in the neck of the nipple.

In testimony whereof I have signed my name to this specification in the presence of two subscribing witnesses.

VICTOR O. JOHNSON.

Witnesses:
PERCIVAL BALL,
R. L. STAPLE.